United States Patent
Gao et al.

(10) Patent No.: US 11,886,905 B2
(45) Date of Patent: Jan. 30, 2024

(54) HOST UPGRADE METHOD AND DEVICE

(71) Applicant: Huawei Cloud Computing Technologies, Co., Ltd., Guizhou (CN)

(72) Inventors: Wei Gao, Shenzhen (CN); Muqiang Xia, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 395 days.

(21) Appl. No.: 17/213,719

(22) Filed: Mar. 26, 2021

(65) Prior Publication Data

US 2021/0216353 A1 Jul. 15, 2021

Related U.S. Application Data

(63) Continuation of application No. PCT/CN2018/108408, filed on Sep. 28, 2018.

(51) Int. Cl.
G06F 9/50 (2006.01)
G06F 9/455 (2018.01)
G06F 8/65 (2018.01)

(52) U.S. Cl.
CPC ............ *G06F 9/45558* (2013.01); *G06F 8/65* (2013.01); *G06F 2009/4557* (2013.01); *G06F 2009/45575* (2013.01)

(58) Field of Classification Search
CPC .. G06F 9/455; G06F 9/45504; G06F 9/45533; G06F 9/50; G06F 9/5005; G06F 9/505; G06F 9/5083; G06F 9/5088
See application file for complete search history.

(56) References Cited

U.S. PATENT DOCUMENTS

| | | | | |
|---|---|---|---|---|
| 10,860,367 B2* | 12/2020 | Mani | ............... | G06F 9/4856 |
| 10,999,147 B2* | 5/2021 | Celozzi | ............... | H04L 41/0893 |
| 11,403,128 B2* | 8/2022 | Toeroe | ............... | G06F 11/30 |
| 2012/0167084 A1 | 6/2012 | Suit | | |
| 2018/0241617 A1 | 8/2018 | Radzikowski et al. | | |
| 2019/0079791 A1 | 3/2019 | Zhong et al. | | |

FOREIGN PATENT DOCUMENTS

| | | |
|---|---|---|
| CN | 104484220 A | 4/2015 |
| CN | 105471994 A | 4/2016 |
| CN | 106301876 A | 1/2017 |
| CN | 106354531 A | 1/2017 |
| CN | 106648462 A | 5/2017 |
| CN | 108319492 A | 7/2018 |

\* cited by examiner

*Primary Examiner* — Andy Ho

(74) *Attorney, Agent, or Firm* — Conley Rose, P.C.

(57) ABSTRACT

A host upgrade method and a device include selecting at least one target host from a plurality of hosts for an upgrade. After the at least one target host is selected, a service running on all virtual machines that are in one or more target service groups and that are deployed on the at least one target host is stopped, and a service running on a virtual machine that is in the one or more target service groups and that is not deployed on the at least one target host is maintained. Then, the at least one target host is upgraded.

20 Claims, 6 Drawing Sheets

HOST UPGRADE METHOD AND DEVICE

CROSS-REFERENCE TO RELATED APPLICATIONS

This application is a continuation of International Patent Application No. PCT/CN2018/108408 filed on Sep. 28, 2018, the disclosure of which is hereby incorporated by reference in its entirety.

TECHNICAL FIELD

This application relates to the field of communications technologies, and in particular, to a host upgrade method and a device.

BACKGROUND

For a cloud service in a telecommunications scenario, a corresponding service is mainly deployed at three layers: a software as a service (SaaS) layer, a platform as a service (PaaS) layer, and an infrastructure as a service (IaaS) layer from top to bottom. A software environment and a software logic that are related to the service are deployed at the SaaS layer. The PaaS layer can provide a software deployment platform without considering details such as hardware and an operating system, so that the PaaS layer can be seamlessly expanded. The IaaS layer is a bottom layer of the cloud service, and mainly provides some basic resources, such as a cloud operating system (for virtual machine deployment), a server, a memory, a switch, and other hardware. The cloud operating system may deploy a virtual machine on each server according to an upper-layer instruction. The IaaS layer provides computing, storage, and network resources for the SaaS layer and the PaaS layer. When the cloud operating system at the IaaS layer needs to upgrade the server, the server needs to be restarted to complete an upgrade. However, a restart of the server interrupts a virtual machine deployed on the server. If the virtual machine is interrupted, the virtual machine cannot continue to provide a service, so that a requirement of service continuity cannot be met.

In order to ensure the service continuity, when the cloud operating system needs to be upgraded, the virtual machine deployed on the server is migrated through a live migration technology. A virtual machine deployed on a to-be-upgraded server is first migrated to a preconfigured redundant server before an upgrade. Then, after the virtual machine on the server is migrated, the migrated server is upgraded. After the upgrade is completed, an upgraded server is used as a redundant server for upgrade of a next server.

However, in a current upgrade manner, a redundant host needs to be configured. In addition, in the live migration technology, only one server can be upgraded at a time. Therefore, upgrade efficiency is low.

SUMMARY

This application provides a host upgrade method and a device, to resolve a problem of relatively low efficiency of a server upgrade solution in other approaches.

According to a first aspect, an embodiment of this application provides a host upgrade method. The method is used to manage upgrade of a plurality of hosts. A virtual machine may be deployed on any one of the plurality of hosts. All virtual machines deployed on the plurality of hosts belong to a plurality of service groups. Each service group processes a service, and different service groups process different services. Each service group corresponds to a maximum shutdown quantity corresponding to the service group. A maximum shutdown quantity of the service group is defined as a maximum quantity of virtual machines that are allowed to be shut down in the service group when the service of the service group keeps running. Further, an upgrade device first selects at least one target host from the plurality of hosts. The at least one target host needs to meet a condition. To be specific, all virtual machines deployed on the at least one target host should belong to one or more target service groups in the plurality of service groups, and for all the virtual machines deployed on the at least one target host, a total quantity of virtual machines that belong to each target service group is not greater than a maximum shutdown quantity corresponding to the corresponding target service group. After determining the at least one target host, the upgrade device stops a service running on all the virtual machines that are in the one or more target service groups and that are deployed on the at least one target host, maintains a service running on a virtual machine that is in the one or more target service groups and that is not deployed on the at least one target host, and then upgrades the at least one target host.

According to the foregoing method, when the hosts are upgraded, the at least one target host is selected from the plurality of hosts for upgrade. For the at least one selected target host, the virtual machines on the at least one selected target host do not need to be migrated. To be specific, when it is ensured that a service of the virtual machines deployed on the at least one target host is not interrupted, the at least one target host may be upgraded. This effectively improves host upgrade efficiency.

With reference to the first aspect, in a first possible implementation of the first aspect, before the upgrade device upgrades the at least one target host, the service running on all the virtual machines that are in the one or more target service groups and that are deployed on the at least one target host may further be migrated to the virtual machine that is in the one or more target service groups and that is not deployed on the at least one target host. In other words, the service of the virtual machines deployed on the at least one target host is delivered to a virtual machine on another host, so that the virtual machine on the other host continues to process the service of the virtual machines on the at least one target host.

According to the foregoing method, a service running on the virtual machine deployed on the at least one target host is not interrupted, to ensure relatively high service processing efficiency in a host upgrade process.

With reference to the first aspect and the first possible implementation of the first aspect, in a second possible implementation of the first aspect, the maximum shutdown quantity of the service group may be set in a plurality of manners. The maximum shutdown quantity of the service group may be preconfigured, or may be set in another manner. The following lists one of the manners.

The upgrade device first obtains a load balancing parameter. The load balancing parameter indicates a ratio of a quantity of virtual machines that are allowed to be shut down in the service group when the service of the service group keeps running to a total quantity of virtual machines included in the service group. The load balancing parameter may be a unified value. Alternatively, each service group may correspond to one load balancing parameter. Then, the upgrade device may calculate the maximum shutdown quantity of the service group based on the load balancing parameter and the total quantity of virtual machines included in the service group.

According to the foregoing method, when upgrading a host, the upgrade device may conveniently determine the maximum shutdown quantity of the service group based on the load balancing parameter.

With reference to any one of the first aspect, the first possible implementation, or the second possible implementation of the first aspect, in a third possible implementation of the first aspect, before upgrading the at least one target host, the upgrade device may further receive a modification instruction for an upgrade group. Then, the at least one target host is added to the upgrade group. A host included in the upgrade group is modified according to the modification instruction for the upgrade group. For example, one or more hosts in the upgrade group are deleted.

According to the foregoing method, the host included in the upgrade group can be flexibly adjusted. Therefore, the method can be applicable to different upgrade scenarios, and an application scope can be extended.

According to a second aspect, an embodiment of this application provides a host upgrade method. The method is used to manage upgrade of a plurality of hosts. A virtual machine may be deployed on any one of the plurality of hosts. All virtual machines deployed on the plurality of hosts belong to a plurality of anti-affinity groups. Each anti-affinity group processes a service, and different anti-affinity groups process different services. Virtual machines in the anti-affinity group are deployed on different hosts. A maximum shutdown quantity corresponding to the anti-affinity group is defined as a maximum quantity of virtual machines that are allowed to be shut down in the anti-affinity group when a service of the anti-affinity group keeps running. Further, an upgrade device selects a first host from the plurality of hosts, and the first host needs to meet a condition. To be specific, all virtual machines deployed on the first host belong to one or more target anti-affinity groups in the plurality of anti-affinity groups. For all the virtual machines deployed on the first host, after a total quantity of virtual machines that belong to each target anti-affinity group is not greater than a maximum shutdown quantity corresponding to the corresponding target anti-affinity group, the upgrade device further needs to select a second host from the plurality hosts, and add the second host and the first host to an upgrade group. All virtual machines deployed on the second host do not belong to any anti-affinity group deployed on the first host. After determining the first host and the second host, the upgrade device stops a service running on all virtual machines that are in the one or more target anti-affinity groups and that are deployed on a host in the upgrade group, maintains a service running on a virtual machine that is in the one or more target anti-affinity groups and that is not deployed on the host in the upgrade group, and then upgrades the host in the upgrade group.

According to the foregoing method, when the hosts are upgraded, the first host and the second host are selected from the plurality of hosts to form the upgrade group. For a selected host in the upgrade group, a virtual machine on the host does not need to be migrated. To be specific, when it is ensured that a service of the virtual machine deployed on the host in the upgrade group is not interrupted, the host in the upgrade group may be upgraded. This effectively improves host upgrade efficiency.

With reference to the second aspect, in a first possible implementation of the second aspect, before the upgrade device upgrades the host in the upgrade group, the service running on all the virtual machines that are in the one or more target anti-affinity groups and that are deployed on the host in the upgrade group may further be migrated to the virtual machine that is in the one or more target service groups and that is not deployed on the host in the upgrade group. In other words, the service of the virtual machine deployed on the host in the upgrade group is delivered to a virtual machine on another host, so that the virtual machine on the other host continues to process the service of the virtual machine deployed on the host in the upgrade group.

According to the foregoing method, a service running on the virtual machine deployed on the host in the upgrade group is not interrupted, so that relatively high service processing efficiency can be ensured in a host upgrade process.

With reference to the second aspect and the first possible implementation of the second aspect, in a second possible implementation of the second aspect, the maximum shutdown quantity of the service group may be set in a plurality of manners. The maximum shutdown quantity of the service group may be preconfigured, or may be set in another manner. The following lists one of the manners.

The upgrade device first obtains a load balancing parameter. The load balancing parameter indicates a ratio of a quantity of virtual machines that are allowed to be shut down in the anti-affinity group when the service of the anti-affinity group keeps running to a total quantity of virtual machines included in the anti-affinity group. The load balancing parameter may be a unified value. Alternatively, each anti-affinity group may correspond to one load balancing parameter. Then, the upgrade device may calculate the maximum shutdown quantity of the anti-affinity group based on the load balancing parameter and the total quantity of virtual machines included in the anti-affinity group.

According to the foregoing method, when upgrading a host, the upgrade device may conveniently determine the maximum shutdown quantity of the anti-affinity group based on the load balancing parameter.

With reference to any one of the second aspect, the first possible implementation, or the second possible implementation of the second aspect, in a third possible implementation of the second aspect, before upgrading the host in the upgrade group, the upgrade device may further receive a modification instruction for the upgrade group. Then, the upgrade device modifies a host included the upgrade group according to the modification instruction for the upgrade group. For example, one or more hosts in the upgrade group are deleted.

According to the foregoing method, the host included in the upgrade group can be flexibly adjusted. Therefore, the method can be applicable to different upgrade scenarios, and an application scope can be extended.

According to a third aspect, an embodiment of this application further provides an upgrade device. The upgrade device is configured to perform the method according to the first aspect and any design of the first aspect. For beneficial effects, refer to descriptions of the first aspect. Details are not described herein again. The upgrade device has a function of implementing an action in a method example in the first aspect. The function may be implemented by hardware, or may be implemented by hardware executing corresponding software. The hardware or software includes one or more modules corresponding to the function. In a possible design, a selection unit, a processing unit, and an upgrade unit are included in a structure of the upgrade device. These units may perform corresponding functions in the method example in the first aspect. For details, refer to detailed descriptions in the method example. Details are not described herein again.

According to a fourth aspect, an embodiment of this application further provides an upgrade device. The upgrade device is configured to perform the method according to the second aspect and any design of the second aspect. For beneficial effects, refer to descriptions of the second aspect. Details are not described herein again. The upgrade device has a function of implementing an action in a method example in the second aspect. The function may be implemented by hardware, or may be implemented by hardware executing corresponding software. The hardware or software includes one or more modules corresponding to the function. In a possible design, a selection unit, a processing unit, and an upgrade unit are included in a structure of the upgrade device. These units may perform corresponding functions in the method example in the second aspect. For details, refer to detailed descriptions in the method example. Details are not described herein again.

According to a fifth aspect, an embodiment of this application further provides an upgrade device. The upgrade device is configured to perform the method according to the first aspect and any design of the first aspect. For beneficial effects, refer to descriptions of the first aspect. Details are not described herein again. A processor and a memory are included in a structure of the upgrade device. The processor executes a program instruction in the memory, to implement the method in the first aspect. The memory is coupled to the processor, and the memory stores a program instruction and data that are necessary for the upgrade device. A communications interface is further included in the structure of the upgrade device, and is configured to communicate with another device.

According to a sixth aspect, an embodiment of this application further provides an upgrade device. The upgrade device is configured to perform the method according to the second aspect and any design of the second aspect. For beneficial effects, refer to descriptions of the second aspect. Details are not described herein again. A processor and a memory are included in a structure of the upgrade device. The processor executes a program instruction in the memory, to implement the method in the second aspect. The memory is coupled to the processor, and the memory stores a program instruction and data that are necessary for the upgrade device. A communications interface is further included in the structure of the upgrade device, and is configured to communicate with another device.

According to a seventh aspect, this application further provides a computer-readable storage medium. The computer-readable storage medium stores an instruction, and when the instruction is run on a computer, the computer is enabled to perform the methods in the foregoing aspects.

According to an eighth aspect, this application further provides a computer program product including an instruction. When the computer program product runs on a computer, the computer is enabled to perform the methods in the foregoing aspects.

According to a ninth aspect, this application further provides a computer chip. The chip is connected to a memory. The chip is configured to read and execute a software program stored in the memory, to perform the methods in the foregoing aspects.

DESCRIPTION OF EMBODIMENTS

Embodiments of this application provide a host upgrade method and a device, to resolve a problem of relatively low efficiency of a server upgrade solution in the other approaches. The method and the device in this application are based on a same concept. The method and the device have similar problem resolving principles. Therefore, for implementation of the device and the method, mutual reference may be made. Details of repeated parts are not described again.

Figure 1:
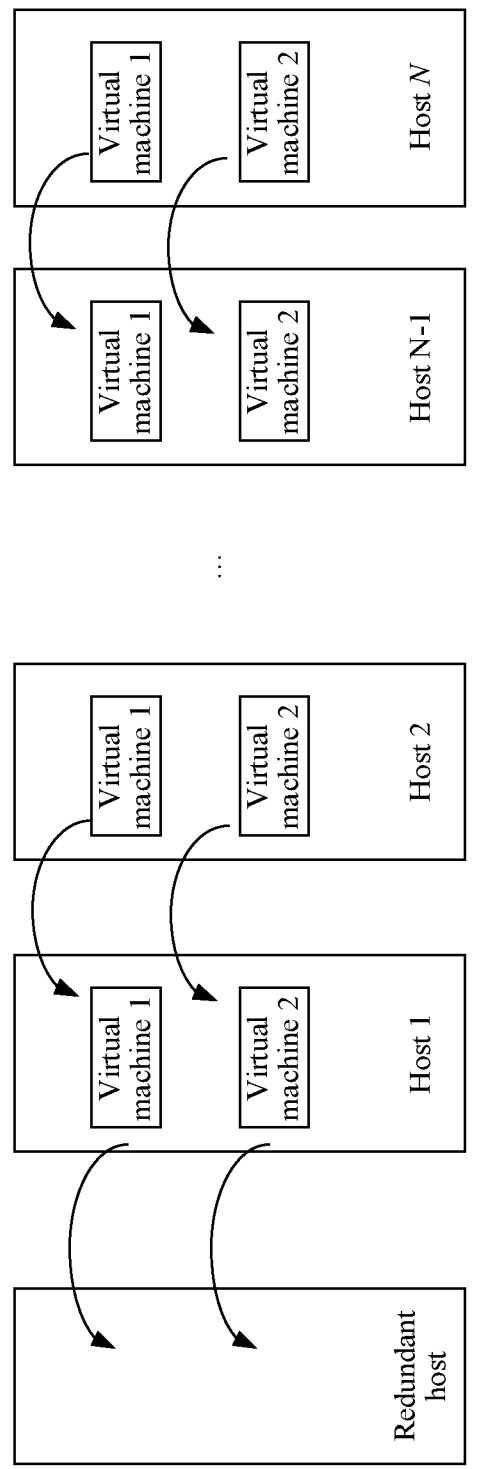
FIG. 1 is a schematic diagram of an existing host upgrade method.

As shown in FIG. 1, according to deployment of a cloud operating system, one or more virtual machines (VM) are deployed on hosts. To distinguish the hosts, the hosts are numbered as a host 1, a host 2, . . . , a host N−1, and a host N. One or more virtual machines are deployed on each host. For ease of description, for example, two virtual machines are deployed on each host. Before an upgrade, an empty host is preconfigured as a redundant host. In this case, two virtual machines on the host 1 are migrated to the redundant host. After being migrated to the redundant host, the virtual machines may continue to work properly. In this case, because no virtual machine is deployed on the host 1, the host 1 may be upgraded. An upgraded host 1 may be used as a new redundant host, and two virtual machines on the host 2 may be migrated to the upgraded host 1. The two virtual machines migrated to the upgraded host 1 may continue to work properly. In this case, because no virtual machines is deployed on the host 2, the host 2 may be upgraded. In this serial manner, after virtual machines on the host N are migrated to the host N−1, and the host N is upgraded, an entire upgrade is completed.

It can be learned from the foregoing upgrade process that, in this solution, the redundant host needs to be preconfigured in a host upgrade process, and a plurality of hosts cannot be upgraded concurrently in an entire upgrade process. Consequently, host upgrade efficiency is relatively low. Therefore, this application provides a host upgrade method.

Some terms in this application are first described, to help a person skilled in the art have a better understanding.

1. In the embodiments of this application, a host is a device on which a virtual machine is deployed. The host may be a physical server, for example, a rack server or a blade server. A specific type of the host is not limited in this application. Any device that may be deployed with the virtual machine and that needs to be upgraded may be used as the host.

2. A virtual machine is a virtual device that has a hardware function and that is simulated through software, for example, a virtual computer. The virtual machine is deployed on a host and can process a service. To distinguish different virtual machines, an attribute such as an anti-affinity attribute or a service group to which the virtual machine belongs may be set for the virtual machine.

3. A service group: Generally, when a service is executed, a plurality of virtual machines is required to process the service at the same time. To distinguish virtual machines that process different services, the virtual machines are grouped. Virtual machines that process a same service are grouped to a service group. Different service groups process different services. Virtual machines in one service group may be deployed on a same host or different hosts. This is not limited in the embodiments of this application. The service mentioned in the embodiments of this application may be a service in a telecommunications scenario, for example, a voice call service, a video service, or a multimedia service, or may be a service in another application scenario.

4. An anti-affinity and an anti-affinity group: The anti-affinity is an attribute of a virtual machine. To distinguish anti-affinities of virtual machines, attribute values may be set for the anti-affinities of the virtual machines. When attribute values of anti-affinities of two virtual machines are the same, it indicates that the anti-affinities of the virtual machines are the same, otherwise, it indicates that the anti-affinities of the virtual machines are different. The anti-affinity of the virtual machine may be used to determine whether the virtual machine can be deployed on a same host as another virtual machine. To be specific, virtual machines with different anti-affinities may be deployed on one host, but virtual machines with a same anti-affinity cannot be deployed on a same host, and can only be separately deployed on different hosts. Two virtual machines with a same anti-affinity cannot exist on one host. When all virtual machines in a service group have a same anti-affinity, the service group is also referred to as an anti-affinity group. In other words, virtual machines that process a same service and have a same anti-affinity may form an anti-affinity group. An anti-affinity group executes a same service. The anti-affinity group is a type of service group.

In addition, a weak anti-affinity may further be set for the virtual machine. For example, an attribute value of the weak anti-affinity may be set to a specific value. A virtual machine having the weak anti-affinity may be deployed on a same host with a virtual machine having any anti-affinity.

It should be noted that the anti-affinity or the weak anti-affinity may not be set for the virtual machine, and a virtual machine without the anti-affinity or a plurality of virtual machines without the weak anti-affinity may be deployed on one host. During grouping, a virtual machine having an anti-affinity and a virtual machine having a weak anti-affinity that process a same service may be added to an anti-affinity group. Virtual machines that process a same service and have no anti-affinity or weak anti-affinity may be added to an anti-affinity group.

5. A load balancing (LB) parameter: Load balancing is a cluster technology of a host or a network device. The load balancing is to distribute specified services (such as network services and network traffic) to a plurality of hosts or network devices to improve service processing capability and ensure high service availability. In a specific application scenario, a quantity of resources required to be deployed (for example, a quantity of virtual machines of a type) may be determined based on a service scale. Then, different conditions during an upgrade (for example, different time periods) are considered to determine a specification of actually required resources (for example, a ratio of a minimum quantity of virtual machines that are actually required to run properly for each service to a total quantity of virtual machines that are in a same service). The load balancing parameters are used to determine the specification and a ratio of the actually required resources.

(6) "A plurality of" means two or more, and another quantifier is similar to this. "And/or" is an association relationship for describing associated objects and indicates that three relationships may exist. For example, A and/or B may indicate the following three cases: only A exists, both A and B exist, and only B exists.

Figure 2:
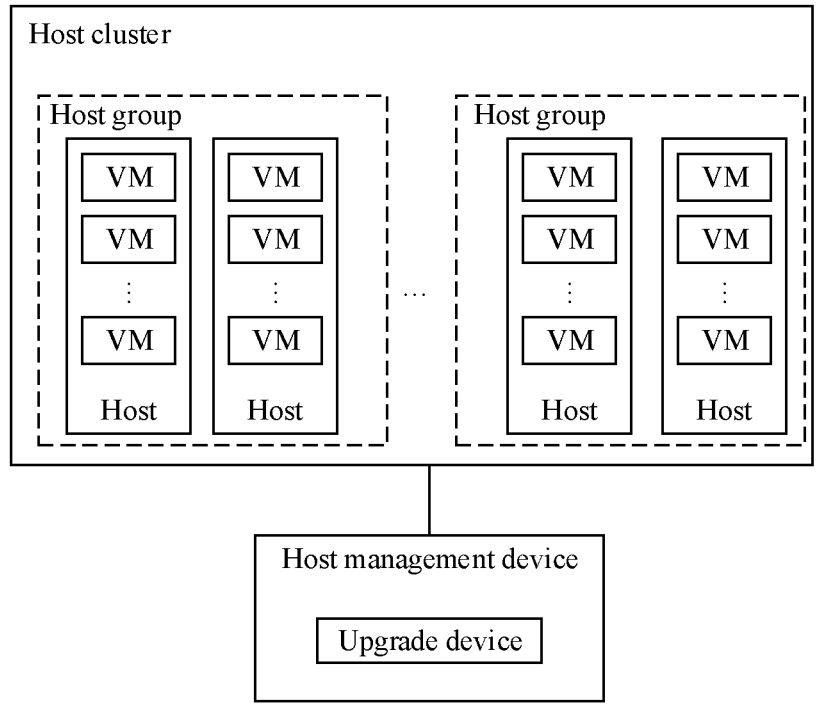
FIG. 2 is a schematic structural diagram of a network system according to an embodiment of this application.

To improve host upgrade efficiency, an embodiment of this application provides a host upgrade method. As shown in FIG. 2, an upgrade device performs the host upgrade method provided in this embodiment of this application. Actually, a type of the upgrade device that performs the host upgrade method is not limited in this embodiment of this application. For example, the upgrade device is a chip, or may be a processor, a host, or the like.

FIG. 2 is a schematic structural diagram of a network system to which this application is applicable. The network system may include a host cluster including a plurality of hosts and a host management device.

The host cluster may include the plurality of hosts, and the plurality of hosts may be grouped into a plurality of host groups. Virtual machines may be deployed on hosts in each host group, and one or more virtual machines may be deployed on each host.

All the virtual machines deployed on the hosts in the host group may be grouped into a plurality of service groups based on a service. Each service group includes one or more virtual machines, and the virtual machines in each service group are configured to execute a same service. Alternatively, the virtual machines may be grouped into a plurality of anti-affinity groups based on anti-affinities of the virtual machines, and one anti-affinity group is configured to execute a same service.

The host management device is configured to manage the host groups. Further, the host management device may manage virtual machines deployed on hosts in the host groups. The host management device may allocate services to virtual machines deployed on the plurality of hosts, and may also control the plurality of hosts to be shut down or restarted. The host management device includes at least one management host. The at least one management host works cooperatively to manage the host cluster.

From a functional perspective, the host management device may include an upgrade device. The upgrade device controls upgrade of the host groups. To be specific, the upgrade device controls upgrade of the hosts in the host groups.

Figure 3:
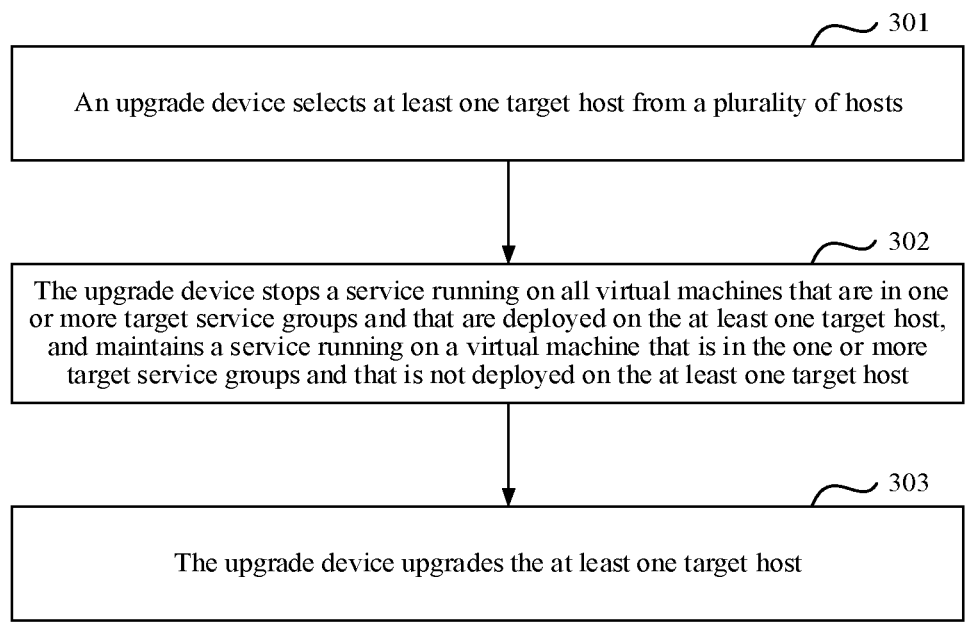
FIG. 3 is a schematic diagram of a host upgrade method according to an embodiment of this application.

FIG. 3 is a schematic diagram of a host upgrade method according to an embodiment of this application. The method shown in FIG. 3 is applied to a plurality of hosts. One or more virtual machines are deployed on each host. A plurality of virtual machines deployed on the plurality of hosts belong to one or more service groups. A plurality of virtual machines that belong to a service group may be deployed on different hosts. A quantity of virtual machines, of the service group, that are deployed on each host is not limited. The method includes the following steps.

Step 301: An upgrade device first selects at least one host from the plurality of hosts as a target host.

Before selecting the at least one target host, the upgrade device first needs to obtain information about the plurality of hosts. The information about the plurality of hosts may include part or all of the following information: device information (such as an identifier of each host) about the plurality of hosts, information (such as a quantity of virtual machines deployed on each host, an identifier of a virtual machine, and information about a service group to which the virtual machine belongs) about the virtual machine deployed on each host, and information (such as an identifier of a virtual machine in each service group, a service executed by each service group, or a code name of the service, where in some cases, the information about the service group may further include an identifier of each service group) about each service group.

The information about the plurality of hosts may be pre-stored in an upgrade device in a host management device, or may be stored in another management device in the host management device, for example, a virtual machine management device or a process management device in the host management device. When the information about the plurality of hosts is stored in the other management device in the host management device, the upgrade device first needs to obtain the information about the plurality of hosts.

The selected at least one target host needs to meet specific conditions, as follows:

Condition 1: All virtual machines deployed on the at least one target host belong to one or more target service groups in a plurality of service groups.

For ease of the following description, the service groups to which all the virtual machines deployed on the at least one target host belong are referred to as target service groups. In other words, virtual machines on a target host are grouped into different service groups based on different services. Any virtual machine deployed on the at least one target host should belong to one target service group in the plurality of service groups. All the virtual machines deployed on the at least one target host may belong to a same target service group in the plurality of service groups, or may belong to different target service groups in the plurality of service groups. A quantity of service groups is determined based on a quantity of services. A quantity of target service groups is not limited in this embodiment of this application. There may be one or more target service groups. The one or more target service groups should be part or all of the plurality of service groups.

Condition 2: For all the virtual machines deployed on the at least one target host, a total quantity of virtual machines that belong to each target service group is not greater than a maximum shutdown quantity corresponding to the corresponding target service group.

To ensure proper running of a service of the target service group, it should be ensured that the total quantity of virtual machines that are deployed on the at least one target host and that belong to each target service group is less than or equal to the maximum shutdown quantity corresponding to the corresponding target service group.

In this embodiment of the present disclosure, a maximum shutdown quantity corresponding to a service group is a maximum quantity of virtual machines that are allowed to be shut down in the service group when the service of the service group keeps running. Correspondingly, the maximum shutdown quantity corresponding to the target service group is a maximum quantity of virtual machines that are allowed to be shut down in the target service group when a service of the target service group keeps running. It is ensured that the total quantity of virtual machines that are deployed on the at least one target host and that are in each target service group is less than or equal to the maximum shutdown quantity corresponding to the corresponding target service group, so that it can be ensured that when the at least one target host is shut down to be upgraded, a virtual machine outside the at least one target host may still support running of a service to an extent, and shutting down the virtual machines on the at least one target host does not affect a service of the one or more target service groups. Alternatively, an impact on the service is acceptable and no severe impact is caused on service processing. In other words, for the at least one selected target host, the virtual machines on the at least one selected target host do not need to be migrated. To be specific, when it is ensured that a service of the virtual machines deployed on the at least one target host is not interrupted, the at least one target host may be upgraded. This effectively improves host upgrade efficiency.

It should be note that the maximum shutdown quantity may be manually set based on experience of an administrator. Alternatively, the maximum shutdown quantity may be automatically set by a metadata server or a host. Parameters such as response time and a storage delay when the service in the service group runs may be used to determine whether remaining virtual machines in the service group can keep the service of the target service group running.

The maximum shutdown quantities may be set in plurality of policies. Policy 1: A shutdown quantity is obtained by running a test sample. For example, a type of service runs in the service group, and the shutdown quantity is gradually increased. After an Nth virtual machine in the target service group is shut down, if response time of the service group to the service can hardly meet a preset threshold, the maximum shutdown quantity of the target service group is N−1. Policy 2: Based on computing resources required by the service and computing resources that each virtual machine can provide, a quantity of virtual machines that need to be reserved for running of the service is calculated. The maximum shutdown quantity corresponding to the target service group=a total quantity of virtual machines in the service group−the quantity of virtual machines that need to be reserved for running of the service in the target service group.

In some cases, proper running of a service in a service group can be ensured to an extent provided that at least one virtual machine in the service group is reserved. Therefore, the maximum shutdown quantity of the target service group=the total quantity of virtual machines in the target service group—1.

In this embodiment of this application, a quantity of selected target hosts is not limited. The upgrade device may select a plurality of target hosts. For any one of the target hosts, a total quantity of virtual machines that are deployed on the plurality of target hosts and that belong to each target service group should be less than or equal to the maximum shutdown quantity corresponding to the corresponding target service group. In other words, for any target service group, a sum of quantities of virtual machines that are deployed on all the target hosts and that belong to the service group is less than or equal to a maximum shutdown quantity corresponding to the target service group.

Figure 4:
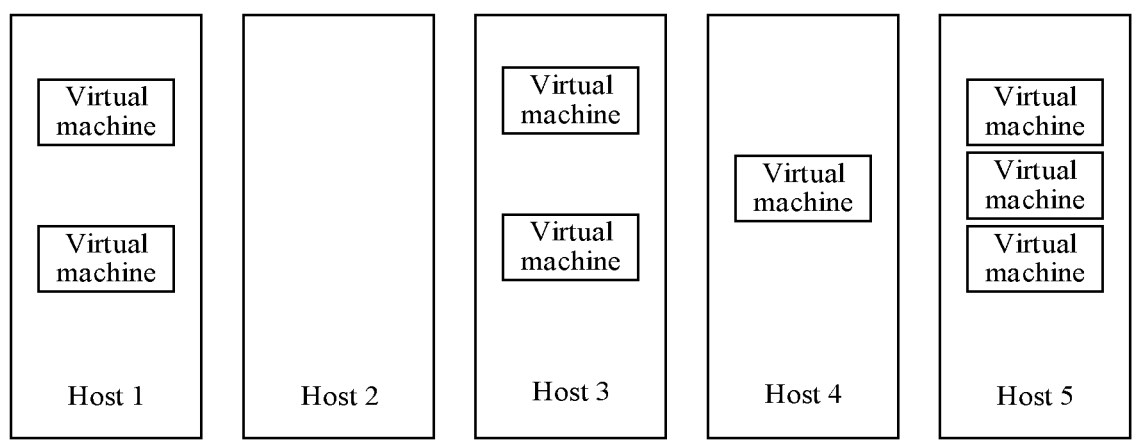
FIG. 4 is a schematic diagram of deployment of a virtual machine according to an embodiment of this application.

As shown in FIG. 4, a quantity of virtual machines included in the target service group is 8, and currently there are five hosts: a host 1, a host 2, a host 3, a host 4, and a host 5. Two virtual machines in the target service group are separately deployed on the host 1 and the host 3. One virtual machine in the target service group is deployed on the host 4. Three virtual machines in the target service group are deployed on the host 5. No virtual machine in the target service group is deployed on the host 2.

It is assumed that the maximum shutdown quantity corresponding to the target service group is 5, so that the quantity of virtual machines that are allowed to be shut down≤(2+0+2+1+3)−5=3. In other words, a total quantity of virtual machines that are shut down at the same time cannot exceed 3. When a device (host) needs to be upgraded, the upgrade device may select the host 5 as a target host. In this case, a quantity of virtual machines in the target service group that are deployed on the host 5 is 3, and is less than the maximum shutdown quantity corresponding to the target service group. Alternatively, the upgrade device may select the host 1 and the host 2 as target hosts. In this case, a total quantity of virtual machines in the target service group that are deployed on the host 1 and the host 2 is 4, and is less than the maximum shutdown quantity corresponding to the target service group. Alternatively, the upgrade device may select the host 1 and the host 5 as the target hosts. In this case, a total quantity of virtual machines in the target service group that are deployed on the host 1 and the host 5 is 5, and is equal to the maximum shutdown quantity corresponding to the target service group.

Based on deployment of a plurality of virtual machines in the target service group that are on the plurality of hosts, the upgrade device has a plurality of solutions for selecting the target host. A specific selection solution is not limited in this embodiment of this application. When there is one target host, any selection manner that can meet that a quantity of virtual machines, in each target service group, that are deployed on the target host is not greater than the maximum shutdown quantity corresponding to the corresponding target service group is applicable to this embodiment of this application. When there is a plurality of target hosts, any selection manner that can meet that a total quantity of virtual machines, in the target service group, that are deployed on the plurality of target hosts is not greater than the maximum shutdown quantity corresponding to the corresponding target service group is applicable to this embodiment of this application.

In the foregoing description, only one service group is used as an example for description. During actual virtual machine deployment, there may be a plurality of service groups. For virtual machines deployed on any host, each virtual machine belongs to a target service group, and different virtual machines may belong to a same target service group, or may belong to different target service groups.

The following describes a case in which the virtual machines deployed on the at least one target host belong to a plurality of target service groups.

When virtual machines deployed on the plurality of hosts belong to different service groups, the upgrade device selects the at least one target host from the plurality of hosts. When a plurality of virtual machines is deployed on the at least one target host, the following case exists. A virtual machine deployed on one of the at least one target host and a virtual machine deployed on another one of the at least one target host belong to different target service groups. For a virtual machine, on the at least one target host, that belongs to any one of the target service groups, a total quantity of virtual machines is not greater than a maximum shutdown quantity corresponding to the corresponding target service group. Maximum shutdown quantities corresponding to different target service groups may be the same or different. This is not limited in this embodiment of this application.

Figure 5:
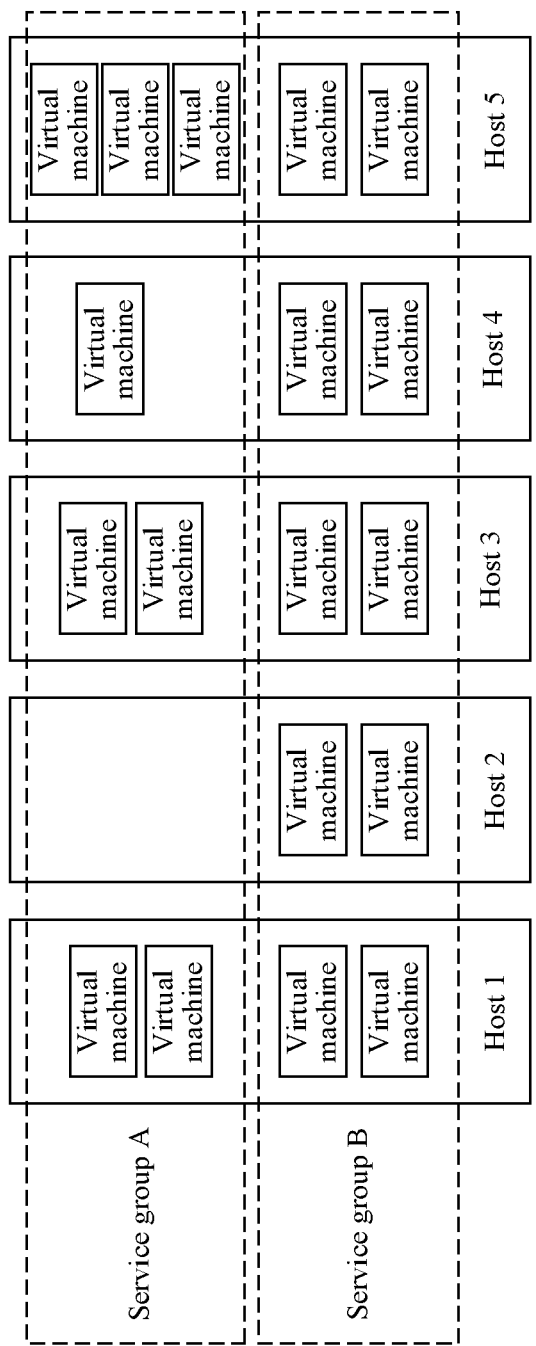
FIG. 5 is a schematic diagram of deployment of a virtual machine according to an embodiment of this application.

As shown in FIG. 5, there are two service groups: a service group A and a service group B. A quantity of virtual machines included in the target service group A is 8. A quantity of virtual machines included in the target service group B is 10. Currently, there are five hosts: a host 1, a host 2, a host 3, a host 4, and a host 5. Two virtual machines in the target service group A are deployed on the host 1 and the host 3. One virtual machine in the target service group A is deployed on the host 4. Three virtual machines in the target service group A are deployed on the host 5. No virtual machine in the target service group A is deployed on the host 2. Two virtual machines in the target service group B are deployed on each host.

It is assumed that a maximum shutdown quantity of the target service group A is 5, and a maximum shutdown quantity of the target service group B is 4. The upgrade device may select the host 5 as the target host. In this case, a quantity of virtual machines in the target service group A that are deployed on the host 5 is 3, and is less than the maximum shutdown quantity of the target service group A. A quantity of virtual machines in the target service group B that are deployed on the host 5 is 2, and is less than the maximum shutdown quantity of the target service group B. Alternatively, the upgrade device may select the host 1 and the host 2 as the target hosts. In this case, a total quantity of virtual machines in the target service group A that are deployed on the host 1 and the host 2 is 4, and is less than the maximum shutdown quantity of the target service group A. A total quantity of virtual machines in the target service group B that are deployed on the host 1 and the host 2 is 4, and is equal to the maximum shutdown quantity of the target service group B. Alternatively, the upgrade device may select the host 1 and the host 5 as the target hosts. In this case, a total quantity of virtual machines in the target service group A that are deployed on the host 1 and the host 5 is 5, and is equal to the maximum shutdown quantity of the target service group A. A total quantity of virtual machines in the target service group that are deployed on the host 1 and the host 5 is 4, and is equal to the maximum shutdown quantity of the target service group B.

When a virtual machine in a service group process a service of the service group, different quantities of virtual machines need to participate in processing the service of the service group. In other words, a large amount of to-be-processed data of the service of the service group requires participation of a large quantity of virtual machines in the service group, and a small amount of to-be-processed data of the service of the service group requires participation of only a small quantity of virtual machines in the service group.

For example, in different time periods of a day, amounts of to-be-processed data of the service of the service group are different. A voice call service is used as an example. An amount of to-be-processed data of the service of the service group in a daytime period is usually greater than an amount of to-be-processed data of the service of the service group in a nighttime period. An amount of to-be-processed data of the service of the service group in an evening period is usually greater than an amount of to-be-processed data of the service of the service group in a midnight period.

A maximum shutdown quantity corresponding to the service group may be estimated based on service statistics within a specific time period through data statistics, and is preconfigured in the host management device. When the upgrade device needs to upgrade a host, a maximum shutdown quantity corresponding to each service group may be obtained. For example, maximum shutdown quantities corresponding to different service groups may be configured in different time periods. When selecting the target host, the upgrade device may determine a maximum shutdown quantity corresponding to the service group in a current time period.

The maximum shutdown quantity corresponding to the service group may be preconfigured, and may be determined in another manner. The following describes one manner.

The upgrade device first obtains a load balancing parameter. The load balancing parameter indicates a ratio of a quantity of virtual machines that are allowed to be shut down in the service group when the service of the service group keeps running to a total quantity of virtual machines included in the service group.

The load balancing parameter is stored in the upgrade device or another management device in the host management device. When the load balancing parameter is stored in the other management device, the upgrade device may obtain the load balancing parameter from the other management device. A manner in which the upgrade device obtains the load balancing parameter is not limited in this embodiment of this application.

After obtaining the load balancing parameter, the upgrade device calculates the maximum shutdown quantity corresponding to the target service group based on the load balancing parameter and the total quantity of virtual machines included in the service group.

Step 302: After determining the at least one target host, the upgrade device stops a service running on all the virtual machines that are in the one or more target service groups and that are deployed on the at least one target host, and maintains a service running on a virtual machine that is in the one or more target service groups and that is not deployed on the at least one target host. It should be noted that maintaining is not stopping. Therefore, a maintenance instruction does not need to be sent to maintain a running service on the virtual machine, provided that a stop instruction is not sent.

In the foregoing manner, it can be ensured that the service of the target service group can run properly, and a service, of the target service group, that needs to run is not interrupted.

For example, because a service running on a virtual machine deployed on each host in a host group is usually allocated and delivered by a task scheduling component, the task scheduling component may deliver service data of each service group to each host in the host group. In this way, after receiving service data of a corresponding service group, a virtual machine that is deployed on each host in the host group and that belongs to the service group runs a service of the service group based on the received service data.

The service data of the service group is data required for running the service of the service group. For example, the service data may be a task instruction, user data, or the like.

Optionally, the upgrade device notifies the task scheduling component, so that the task scheduling component stops the service running on all the virtual machines that are in the one or more target service groups and that are deployed on the at least one target host, and maintains the service running on the virtual machine that is in the one or more target service groups and that is not deployed on the at least one target host. After the upgrade device selects the at least one target host, the total quantity of virtual machines that are deployed on the at least one target host and that are in each target service group is not greater than the maximum shutdown quantity corresponding to the corresponding target service group. In other words, a virtual machine that is deployed on the target host and that is in a target service group may stop processing a service of the corresponding target service group without affecting the service, and a virtual machine that is deployed on another host and that is in the target service group processes the service of the corresponding target service group.

For example, the upgrade device may send a notification message to the task scheduling component. The notification message indicates the task scheduling component to stop delivering service data of the corresponding target service group to a virtual machine that is deployed on the at least one target host and that belongs to the target service group.

In the foregoing description, through the task scheduling component, the upgrade device stops the service running on all the virtual machines that are in the one or more target service groups and that are deployed on the at least one target host, and maintains the service running on the virtual machine that is in the one or more target service groups and that is not deployed on the at least one target host. This manner is merely an example. Actually, there may be another manner to ensure that the upgrade device stops the service running on all the virtual machines that are in the one or more target service groups and that are deployed on the at least one target host, and maintains the service running on the virtual machine that is in the one or more target service groups and that is not deployed on the at least one target host. For example, the upgrade device may send a stop instruction to all the virtual machines that are in the one or more target service groups and that are deployed on the at least one target host, and send a running instruction to all virtual machines that are in the one or more target service groups and that are not deployed on the at least one target host. This is not limited in this application. Any manner in which the service running on all the virtual machines that are in the one or more target service groups and that are deployed on the at least one target host may be stopped and in which the service running on the virtual machine that is in the one or more target service groups and that is not deployed on the at least one target host may be maintained is applicable to this embodiment of this application.

In a possible implementation, before the target host is upgraded, if a service of a corresponding service group still runs on a virtual machine deployed on the target host, the upgrade device migrates, to the virtual machine that is in the one or more target service groups and that is not deployed on the at least one target host, the service running on all the virtual machines that are in the one or more target service groups and that are deployed on the at least one target host.

The upgrade device may deliver, to a virtual machine on another host other than the at least one target host, a service running on the virtual machine that is deployed on the at least one target host and that belongs to each target service group. For example, the service may be delivered to a virtual machine that is deployed on the other host other than the at least one target host in the plurality of hosts and that belongs to the corresponding target service group.

For example, the upgrade device may migrate service data of the virtual machine that is on the at least one target host and in each service group to another virtual machine in the target service group. Alternatively, another management device may be indicated to migrate the service data of the virtual machine that is on the at least one target host and in each service group to the other virtual machine in the target service group. In this way, it can be ensured that a service processed by a virtual machine that is on the target host and in each target service group is not interrupted, and another virtual machine in each target service group can continue to perform processing. The other virtual machine in the target service group is a virtual machine, belonging to the target service group, that is deployed on a host other than the at least one target host in the plurality of hosts.

Before upgrading the at least one target host, the upgrade device may further add the at least one target host to an upgrade group, and receive a modification instruction for the upgrade group. After receiving the modification instruction for the upgrade group, the upgrade device modifies, according to the modification instruction for the upgrade group, a host included in the upgrade group.

For the host in the upgrade group, because of some preset rules, one or more hosts in the upgrade group cannot be upgraded. In this case, the upgrade device receives the modification instruction for the upgrade group, to adjust the host included in the upgrade group. For example, due to a service requirement, a host in the upgrade group further bears another service, and the other service cannot be interrupted. In this case, the modification instruction for the upgrade group instructs the upgrade device to delete the host from the upgrade group. For another example, two hosts that cannot be upgraded at the same time exist in the upgrade group. In this case, the modification instruction for the upgrade group instructs the upgrade device to delete one of the two hosts from the upgrade group.

Step 303: the upgrade device upgrades the at least one target host.

A working state of the target host is changed to a maintenance state. Then, the virtual machine deployed on the target host is disabled. The upgrade device directly or indirectly sends an instruction to trigger the target host to restart and upgrade. In a restart and upgrade process, the target host loads an upgrade file to replace a locally stored related file. After the target host is upgraded, all virtual machines deployed on the target host are enabled, and the maintenance state of the target host is canceled. Therefore, an upgrade operation on the target host is completed.

According to the foregoing method, when the plurality of hosts is upgraded, the at least one target host is selected from the plurality of hosts for upgrade. For the at least one selected target host, the virtual machines on the at least one selected target host do not need to be migrated. To be specific, when it is ensured that a service of the virtual machines deployed on the at least one target host is not interrupted, the at least one target host may be upgraded. This effectively improves host upgrade efficiency.

In actual application, there is a plurality of hosts, and each host may be deployed with a virtual machine. When the hosts are upgraded, a group-based upgrade manner may be used. To be specific, hosts that need to be upgraded are grouped into a plurality of upgrade groups. Each upgrade group includes one or more hosts. After the upgrade groups are determined, an upgrade operation is sequentially performed on the hosts in the upgrade groups. Further, according to the method shown in FIG. 3, at least one target host is selected from a host cluster and added to a first upgrade group. Then, at least one target host is selected from hosts, in the host cluster, that do not belong to the first upgrade group and added to a second upgrade group. After hosts in the host cluster are grouped into different upgrade groups, the hosts in the first upgrade group, the second upgrade group, . . . , and the Nth upgrade group are upgraded in sequence. According to the method shown in FIG. 3, upgrading at least one target host in each upgrade group further includes stopping a service running on all virtual machines that are in the one or more target service groups and that are deployed on the at least one target host, and maintaining a service running on a virtual machine that is in the one or more target service groups and that is not deployed on the at least one target host.

Figure 6:
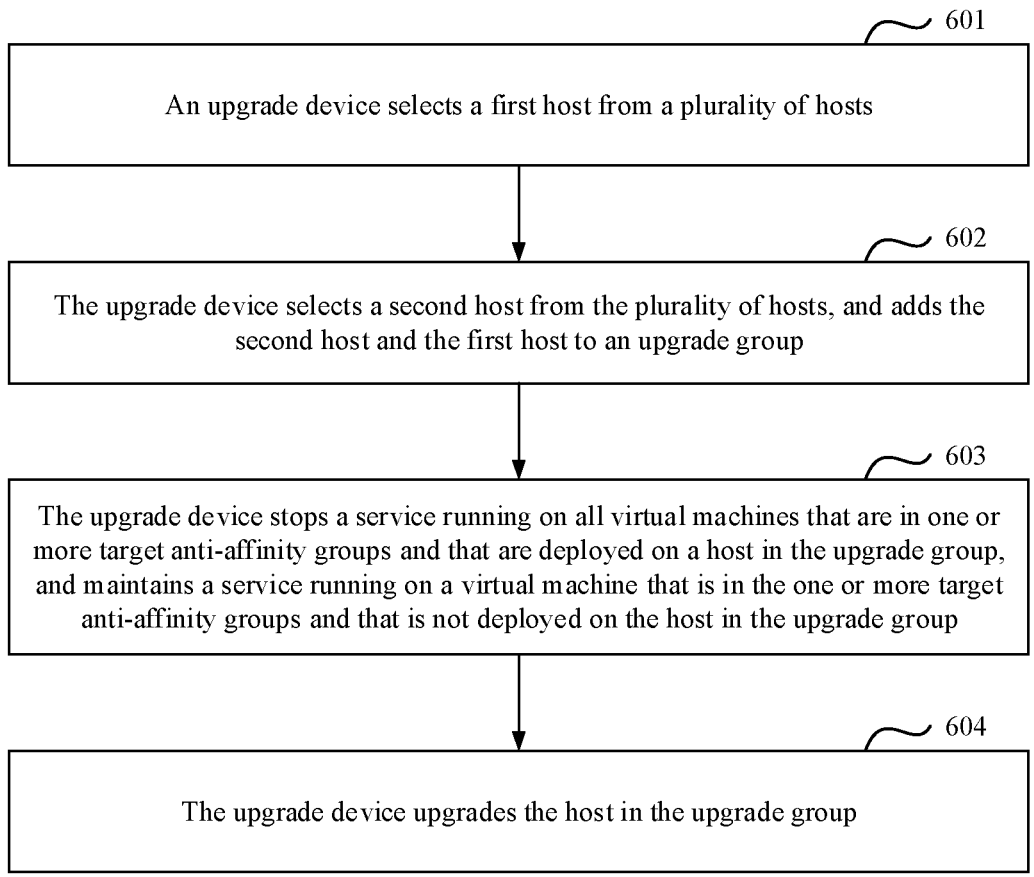
FIG. 6 is a schematic diagram of a host upgrade method according to an embodiment of this application.

FIG. 6 is a schematic diagram of a host upgrade method according to an embodiment of this application. The method shown in FIG. 6 is applied to a plurality of hosts. Compared with the embodiment disclosed in step 301 to step 303, a difference in this embodiment includes that a service group is limited to an anti-affinity group. A plurality of virtual machines in a same service group may be located on a same host or different hosts. However, a plurality of virtual machines in a same anti-affinity group cannot be deployed on a same host.

One or more virtual machines are deployed on each host. A plurality of virtual machines on a plurality of hosts belong to a plurality of anti-affinity groups. Virtual machines in each anti-affinity group process a service, and virtual machines in different anti-affinity groups process different services. A plurality of virtual machines in the anti-affinity group are deployed on different hosts. A maximum shutdown quantity corresponding to the anti-affinity group is a maximum quantity of virtual machines that are allowed to be shut down in the anti-affinity group when a service of the anti-affinity group keeps running. The method includes the following steps.

Step 601: An upgrade device selects a first host from the plurality of hosts, where for virtual machines owned by the first host, a total quantity of virtual machines in each anti-affinity group is not greater than a maximum shutdown quantity corresponding to the corresponding anti-affinity group. After the first host is selected, it may be considered that the first host is added to an upgrade group. A host in the upgrade group is upgraded in a subsequent step.

Before selecting the first host, the upgrade device first needs to obtain information about the plurality of hosts. The information about the plurality of hosts may include part or all of the following information: device information (such as an identifier of each host) about the plurality of hosts, information (such as a quantity of virtual machines deployed on each host, an identifier of a virtual machine, and information about an anti-affinity group to which the virtual machine belongs) about the virtual machine deployed on each host, and information (such as an identifier of a virtual machine in each anti-affinity group, an identifier of each anti-affinity group, a service executed by each anti-affinity group, or a code name of the service) about each anti-affinity group.

The information about the plurality of hosts may be pre-stored in the upgrade device that is in a host management device, or may be stored in the host management device. When the information about the plurality of hosts is stored in the host management device, the upgrade device needs to obtain the information about the plurality of hosts from the host management device.

The selected first host needs to meet the following specific conditions:

Condition 1: All virtual machines deployed on the first host belong to one or more target anti-affinity groups in the plurality of anti-affinity groups.

For ease of the following description, service groups to which all the virtual machines deployed on the first host belong are referred to as target anti-affinity groups. It is equivalent to grouping virtual machines on the first host into different service groups based on different services. Any virtual machine deployed on the first host should belong to one of the plurality of anti-affinity groups. All the virtual machines deployed on the first host may belong to a same target anti-affinity group in the plurality of anti-affinity groups, or may belong to different target anti-affinity groups in the plurality of anti-affinity groups. A quantity of service groups is determined based on a quantity of services. A quantity of target anti-affinity groups is not limited in this embodiment of this application. There may be one or more target anti-affinity groups.

Condition 2: For all the virtual machines deployed on the first host, a total quantity of virtual machines that belong to each target anti-affinity group is not greater than a maximum shutdown quantity corresponding to the corresponding target anti-affinity group.

To ensure proper running of a service of the target anti-affinity group, it should be ensured that a total quantity of virtual machines that are deployed on the first host and that belong to each target anti-affinity group is less than or equal to the maximum shutdown quantity corresponding to the corresponding target anti-affinity group.

In this embodiment of this application, the maximum shutdown quantity corresponding to the anti-affinity group is the maximum quantity of virtual machines that are allowed to be shut down in the anti-affinity group when the service of the anti-affinity group keeps running. Correspondingly, the maximum shutdown quantity corresponding to the target anti-affinity group is a maximum quantity of virtual machines that are allowed to be shut down in the target anti-affinity group when a service of the target anti-affinity group keeps running. It is ensured that the total quantity of virtual machines that are deployed on the first host and that are in each target service group is less than or equal to the maximum shutdown quantity corresponding to the corresponding target anti-affinity group, so that it can be ensured that when the first host is shut down to be upgraded, a virtual machine outside the first host may still support running of a service to an extent, and shutting down the virtual machines on the first host does not affect a service of the one or more target anti-affinity groups. Alternatively, an impact on the service is acceptable and no severe impact is caused on service processing. In other words, for the selected first host, the virtual machines on the selected first host do not need to be migrated. To be specific, when it is ensured that a service of the virtual machines deployed on the first host is not interrupted, the first host may be upgraded. This effectively improves host upgrade efficiency.

The anti-affinity group is a service group that includes virtual machines having a same anti-affinity. For a method for selecting at least one target anti-affinity group from the plurality of anti-affinity groups, refer to the method for selecting at least one target service group from the plurality of service groups in the foregoing embodiment. Details are not described herein again. Similarly, for description of the maximum shutdown quantity, refer to the description in step 301.

Step 602: After selecting the first host, the upgrade device selects a second host from the plurality of hosts, and adds the second host and the first host to the upgrade group, where all virtual machines deployed on the second host do not belong to any one of the target anti-affinity groups.

A quantity of second hosts is not limited in this embodiment of this application. The upgrade device may determine one second host or a plurality of second hosts. Any host may be used as the second host, provided that a virtual machine deployed on the host does not belong to any one of the target anti-affinity groups.

The upgrade device may traverse hosts other than the first host in the plurality of hosts, sequentially determine whether a virtual machine deployed on each host belongs to any one of the target anti-affinity groups. If no, the host is determined as the second host.

The quantity of second hosts is not limited in this embodiment of this application. Any host may be used as the second host, provided that a virtual machine deployed on the host does not belong to any one of the target anti-affinity groups.

After determining the first host and the second host, the upgrade device may add the first host and the second host to the upgrade group, and perform step 603.

Step 603: The upgrade device stops a service running on all virtual machines that are in the one or more target anti-affinity groups and that are deployed on a host in the upgrade group, and maintains a service running on a virtual machine that is in the one or more target anti-affinity groups and that is not deployed on the host in the upgrade group.

In the foregoing manner, it can be ensured that the service of the target anti-affinity group runs properly, and a service that needs to run on the target anti-affinity group is not interrupted.

For example, because a service running on a virtual machine deployed on each host in a host group is usually allocated and delivered by a task scheduling component, the task scheduling component may deliver service data of each anti-affinity group to each host in the host group. In this way, after receiving service data of a corresponding anti-affinity group, a virtual machine that is deployed on each host in the host group and that belongs to the anti-affinity group runs a service of the anti-affinity group based on the received service data.

The service data of the anti-affinity group is data required for running the service of the anti-affinity group. For example, the service data may be a task instruction, user data, or the like.

Optionally, the upgrade device notifies the task scheduling component, so that the task scheduling component stops the service running on all the virtual machines that are in the one or more target anti-affinity groups and that are deployed on the host in the upgrade group, and maintains the service running on the virtual machine that is in the one or more target anti-affinity groups and that is not deployed on the host in the upgrade group.

After the upgrade device selects the first host and the second host, because the total quantity of virtual machines that are deployed on the first host and that are in each target anti-affinity group is not greater than the maximum shutdown quantity corresponding to the corresponding target anti-affinity group. In other words, a virtual machine that is deployed on the first host and that is in a target anti-affinity group may stop processing a service of the target anti-affinity group without affecting the service, and a virtual machine that is deployed on another host and that is in the target anti-affinity group processes the service of the target anti-affinity group.

For example, the upgrade device may send a notification message to the task scheduling component. The notification message indicates the task scheduling component to stop delivering service data of a corresponding target anti-affinity group to a virtual machine that is deployed on the host in the upgrade group and that belongs to the target anti-affinity group.

In the foregoing description, through the task scheduling component, the upgrade device stops the service running on all the virtual machines that are in the one or more target anti-affinity groups and that are deployed on the host in the upgrade group, and maintains the service running on the virtual machine that is in the one or more target anti-affinity groups and that is not deployed on the host in the upgrade group. This manner is merely an example. Actually, there may be another manner to ensure that the upgrade device stops the service running on all the virtual machines that are in the one or more target anti-affinity groups and that are deployed on the host in the upgrade group, and maintains the service running on the virtual machine that is in the one or more target anti-affinity groups and that is not deployed on the host in the upgrade group. For example, the upgrade device may send a stop instruction to all the virtual machines that are in the one or more target anti-affinity groups and that are deployed on the host in the upgrade group, and send a running instruction to all virtual machines that are in the one or more target anti-affinity groups and that are not deployed on the host in the upgrade group. This is not limited in this application. Any manner in which the service running on all the virtual machines that are in the one or more target anti-affinity groups and that are deployed on the host in the upgrade group may be stopped and in which the service running on the virtual machine that is in the one or more target anti-affinity groups and that is not deployed on the host in the upgrade group may be maintained is applicable to this embodiment of this application.

In a possible implementation, before the host in the host group is upgraded, if a service of a corresponding anti-affinity group still runs on a virtual machine deployed on the host in the host group, the upgrade device migrates, to the virtual machine that is in the one or more target service groups and that is not deployed on the host in the upgrade group, the service running on all the virtual machines that are in the one or more target anti-affinity groups and that are deployed on the host in the upgrade group.

For each target anti-affinity group, the upgrade device may deliver a service running on a virtual machine in the upgrade group to a virtual machine deployed on a host other than the host in the upgrade group. For example, the service may be delivered to, in a plurality of hosts involved in the target anti-affinity group, a virtual machine that is deployed on a host other than the host in the upgrade group and that belongs to the target anti-affinity group.

For example, the upgrade device may migrate service data of the virtual machine that is deployed on the host in the upgrade group and that is in each target anti-affinity group to another virtual machine in the target anti-affinity group. Alternatively, another management device may be indicated to migrate the service data of the virtual machine that is deployed on the host in the upgrade group and that is in each anti-affinity group to the other virtual machine in the target anti-affinity group. In this way, it can be ensured that a service processed by a virtual machine that is on the first host and in the target anti-affinity group is not interrupted, and another virtual machine in the target anti-affinity group can continue to perform processing. The other virtual machine in the target anti-affinity group is a virtual machine that belongs to the target anti-affinity group and that is deployed on a host, other than the host in the upgrade group, in the plurality of hosts.

Before the upgrade device upgrades the host in the upgrade group, the upgrade device may further receive a modification instruction for the upgrade group. After receiving the modification instruction for the upgrade group, the upgrade device modifies, according to the modification instruction for the upgrade group, a host included in the upgrade group.

For the host in the upgrade group, because of some preset rules, the first host or the second host cannot be upgraded. In this case, the upgrade device receives the modification instruction for the upgrade group, to adjust the host included in the upgrade group. For example, due to a service requirement, one host in the upgrade group further bears another service, and the other service cannot be interrupted. In this case, the modification instruction for the upgrade group instructs the upgrade device to delete the host from the upgrade group. For another example, two hosts that cannot be upgraded at the same time exist in the upgrade group. In this case, the modification instruction for the upgrade group instructs the upgrade device to delete one of the two hosts from the upgrade group.

For example, the upgrade device may send information about the upgrade group to another management device. The information about the upgrade group is used to represent the host in the upgrade group. The other management device determines the modification instruction for the upgrade group based on the information about the upgrade group. Then, the other management device sends the modification instruction for the upgrade group to the upgrade device. The upgrade device updates, according to the modification instruction for the upgrade group, the host included in the upgrade group.

Step 604: The upgrade device indicates the host in the upgrade group to upgrade.

For a host upgrade method, refer to related descriptions in step 303. Details are not described herein again.

According to the foregoing method, when the plurality of hosts is upgraded, the first host and the second host are selected from the plurality of hosts to form the upgrade group. For a selected host in the upgrade group, a virtual machine on the host does not need to be migrated. To be specific, when it is ensured that a service of a virtual machine deployed on the host in the upgrade group is not interrupted, the host in the upgrade group may be upgraded. This effectively improves host upgrade efficiency.

In actual application, there is a plurality of hosts, and each host may be deployed with a virtual machine. When the hosts are upgraded, a group-based upgrade manner may be used. To be specific, hosts that need to be upgraded are grouped into a plurality of upgrade groups. Each upgrade group includes one or more hosts. After the upgrade groups are determined, an upgrade operation is sequentially performed on the hosts in the upgrade groups. Further, according to the method shown in FIG. 6, a first host and a second host are selected from a host cluster and added to a first upgrade group. Then, a first host and a second host are selected from hosts, in the host cluster, that do not belong to the first upgrade group and added to a second upgrade group. After hosts in the host cluster are grouped into different upgrade groups, the hosts in the first upgrade group, the second upgrade group, . . . , and the Nth upgrade group are upgraded in sequence. According to the method shown in FIG. 6, upgrading a host in each upgrade group further includes stopping a service running on all virtual machines that are in the one or more target anti-affinity groups and that are deployed on the host in the upgrade group, and maintaining a service running on a virtual machine that is in the one or more target service groups and that is not deployed on the host in the upgrade group.

Figure 7:
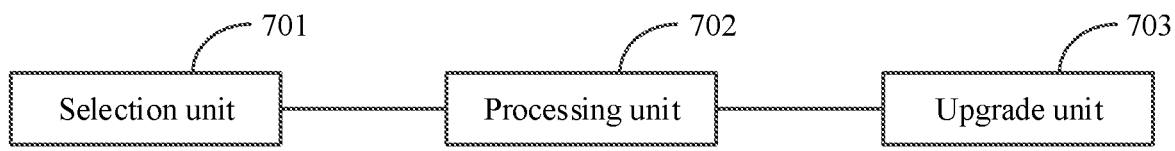
FIG. 7 is a structural diagram of an upgrade device according to an embodiment of this application.

Based on a same concept as the method embodiment shown in FIG. 3, an embodiment of this application further provides an upgrade device, configured to perform the method performed by the upgrade device in the method embodiment shown in FIG. 3. For related features, refer to the method embodiment. Details are not described herein again. As shown in FIG. 7, an upgrade device 700 includes a selection unit 701, a processing unit 702, and an upgrade unit 703.

The upgrade device 700 is configured to manage upgrade of a plurality of hosts. A virtual machine may be deployed on any one of the plurality of hosts. All virtual machines deployed on the plurality of hosts belong to a plurality of service groups. Each service group processes a service, and different service groups process different services. Each service group corresponds to a maximum shutdown quantity. A maximum shutdown quantity corresponding to a service group is a maximum quantity of virtual machines that are allowed to be shut down in the service group when the service of the service group keeps running.

The selection unit 701 is configured to select at least one target host from the plurality of hosts. All virtual machines deployed on the at least one target host belong to one or more target service groups in the plurality of service groups.

The processing unit 702 is configured to stop a service running on all the virtual machines that are in the one or more target service groups and that are deployed on the at least one target host, and maintain a service running on a virtual machine that is in the one or more target service groups and that is not deployed on the at least one target host.

The upgrade unit 703 is configured to indicate the at least one target host to upgrade.

In a possible implementation, before the upgrade unit 703 upgrades the at least one target host, the processing unit 702 may further migrate all the virtual machines that are in the one or more target service groups and that are deployed on the at least one target host to the virtual machine that is in the one or more target service groups and that is not deployed on the at least one target host. In other words, a service of a virtual machine deployed on the at least one target host is delivered to a virtual machine on another host, so that the virtual machine on the other host continues to process the service of the virtual machine on the at least one target host.

The maximum shutdown quantity of the service group may be set in a plurality of manners. The maximum shutdown quantity of the service group may be preconfigured, or may be set in another manner. One of the manners is described below.

The selection unit 701 first obtains a load balancing parameter. The load balancing parameter indicates a ratio of a quantity of virtual machines that are allowed to be shut down in the service group when the service of the service group keeps running to a total quantity of virtual machines included in the service group. Then, the selection unit 701 calculates the maximum shutdown quantity of the service group based on the load balancing parameter and the total quantity of virtual machines included in the service group.

Before the upgrade unit 703 upgrades the at least one target host, the processing unit 702 may further add the at least one target host to an upgrade group. If a modification instruction for the upgrade group is received, the processing unit 702 modifies, according to the modification instruction for the upgrade group, a host included in the upgrade group. For example, one or more hosts in the upgrade group are deleted.

Figure 8:
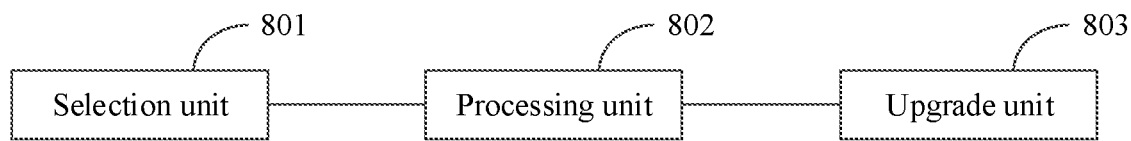
FIG. 8 is a structural diagram of an upgrade device according to an embodiment of this application.

Based on a same concept as the method embodiment shown in FIG. 6, an embodiment of this application further provides an upgrade device, configured to perform the method performed by the upgrade device in the method embodiment shown in FIG. 6. For related features, refer to the method embodiment. Details are not described herein again. As shown in FIG. 8, an upgrade device 800 includes a selection unit 801, a processing unit 802, and an upgrade unit 803.

The upgrade device 800 is configured to manage upgrade of a plurality of hosts. Virtual machines are deployed on the plurality of the hosts. All the virtual machines deployed on the plurality of hosts belong to a plurality of anti-affinity groups. Each anti-affinity group processes a service, and different anti-affinity groups process different services. A plurality of virtual machines in an anti-affinity group are deployed on different hosts of the plurality of hosts. A maximum shutdown quantity of the anti-affinity group is a maximum quantity of virtual machines that are allowed to be shut down in the anti-affinity group when a service of the anti-affinity group keeps running.

The selection unit 801 is configured to select a first host and a second host from the plurality of hosts.

All virtual machines deployed on the first host belong to one or more target anti-affinity groups in the plurality of anti-affinity groups. For all the virtual machines deployed on the first host, a total quantity of virtual machines that belong to each target anti-affinity group is not greater than a maximum shutdown quantity corresponding to the corresponding target anti-affinity group. All virtual machines deployed on the second host do not belong to any one of the target anti-affinity groups.

The processing unit 802 is configured to stop a service running on all virtual machines that are in the one or more target anti-affinity groups and that are deployed on a host in an upgrade group, and maintain a service running on a virtual machine that is in the one or more target anti-affinity groups and that is not deployed on the host in the upgrade group.

The upgrade unit 803 is configured to indicate the host in the upgrade group to upgrade.

Before the upgrade unit 803 upgrades the host in the upgrade group, the processing unit 802 may further migrate on all the virtual machines that are in the one or more target anti-affinity groups and that are deployed on the host in the upgrade group to the virtual machine that is in the one or more target service groups and that is not deployed on the host in the upgrade group. In other words, a service of a virtual machine deployed on the host in the upgrade group is delivered to a virtual machine on another host, so that the virtual machine on the other host continues to process the service of the virtual machine deployed on the host in the upgrade group.

The maximum shutdown quantity of the service group may be set in a plurality of manners. The maximum shutdown quantity of the service group may be preconfigured, or may be set in another manner. One of the manners is described below.

The selection unit 801 first obtains a load balancing parameter. The load balancing parameter indicates a ratio of a quantity of virtual machines that are allowed to be shut down in the target anti-affinity group when the service of the anti-affinity group keeps running to a total quantity of virtual machines included in the anti-affinity group. Then, the selection unit 801 further calculates the maximum shutdown quantity of the anti-affinity group based on the load balancing parameter and the total quantity of virtual machines included in the anti-affinity group.

Before the upgrade unit 803 upgrades the host in the upgrade group, the processing unit 802 may further receive a modification instruction for the upgrade group. Then, the processing unit 802 modifies, according to the modification instruction for the upgrade group, the host included in the upgrade group. For example, one or more hosts in the upgrade group are deleted.

Division into units in the embodiments of this application is an example, is only logical function division, and may be other division in actual implementation. In addition, functional units in the embodiments of this application may be integrated in one processor, or may exist alone physically, or two or more units are integrated into one module. The foregoing integrated module may be implemented in a form of hardware, or may be implemented in a form of a software functional module.

When the integrated unit is implemented in a form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in a form of a software product. The software product is stored in a storage medium and includes several instructions for instructing a terminal device (which may be a personal computer, a mobile phone, a network device, or the like) or a processor to perform all or some of the steps of the methods in the embodiments of this application. The storage medium includes any medium that can store program code, such as a Universal Serial Bus (USB) flash drive, a removable hard disk, a read-only memory (ROM), a random-access memory (RAM), a magnetic disk, or an optical disc.

Based on the method embodiment shown in FIG. 3, an embodiment of this application further provides an upgrade device. The upgrade device is configured to implement the host upgrade method shown in FIG. 3. In a simple embodiment, the upgrade device may be in a form shown in FIG. 9.

Figure 9:
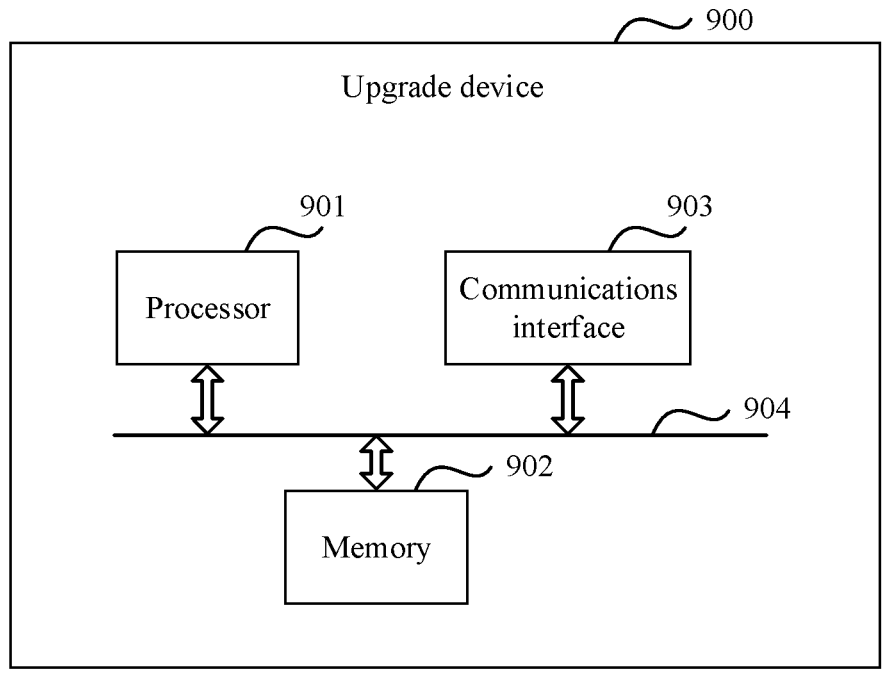
FIG. 9 is a structural diagram of an upgrade device according to an embodiment of this application.

As shown in FIG. 9, an upgrade device 900 includes at least one processor 901 and a memory 902, and optionally, may further include a communications interface 903.

The memory 902 may be a volatile memory such as a RAM. Alternatively, the memory may be a non-volatile memory such as a ROM, a flash memory, a hard disk drive (HDD), or a solid-state drive (SSD). Alternatively, the memory 902 is any other medium that can be used to carry or store expected program code in a command or data structure form and that can be accessed by a computer. However, this is not limited. The memory 902 may be a combination of the memories.

In this embodiment of this application, a specific connection medium between the processor 901 and the memory 902 is not limited. In this embodiment of this application, the memory 902 is connected to the processor 901 through a bus 904 in the figure. The bus 904 is represented by a thick line in the figure. A connection manner between other components is schematically described, and is not limited thereto. The bus 904 may be classified into an address bus, a data bus, a control bus, and the like. For ease of representation, only one thick line is used to represent the bus in FIG. 9, but this does not mean that there is only one bus or only one type of bus.

The processor 901 may have a data receiving and sending function, and can communicate with another management device. In the apparatus shown in FIG. 9, an independent data receiving and sending module, for example, the communications interface 903, may also be disposed and is configured to receive and send data. When communicating with the other management device, the processor 901 may perform data transmission through the communications interface 903.

When the upgrade device is in the form shown in FIG. 9, the processor 901 in FIG. 9 may invoke a program stored in the memory 902, so that the upgrade device may perform the method performed by the upgrade device in the method embodiment shown in FIG. 3.

Further, functions/implementation processes of the selection unit, the processing unit, and the upgrade unit in FIG. 7 may be implemented by the processor 901 in FIG. 9 by invoking a computer-executable instruction stored in the memory 902.

Based on the method embodiment shown in FIG. 6, an embodiment of this application further provides an upgrade device. The upgrade device is configured to implement the host upgrade method shown in FIG. 6. In a simple embodiment, the upgrade device may be in a form shown in FIG. 10.

Figure 10:
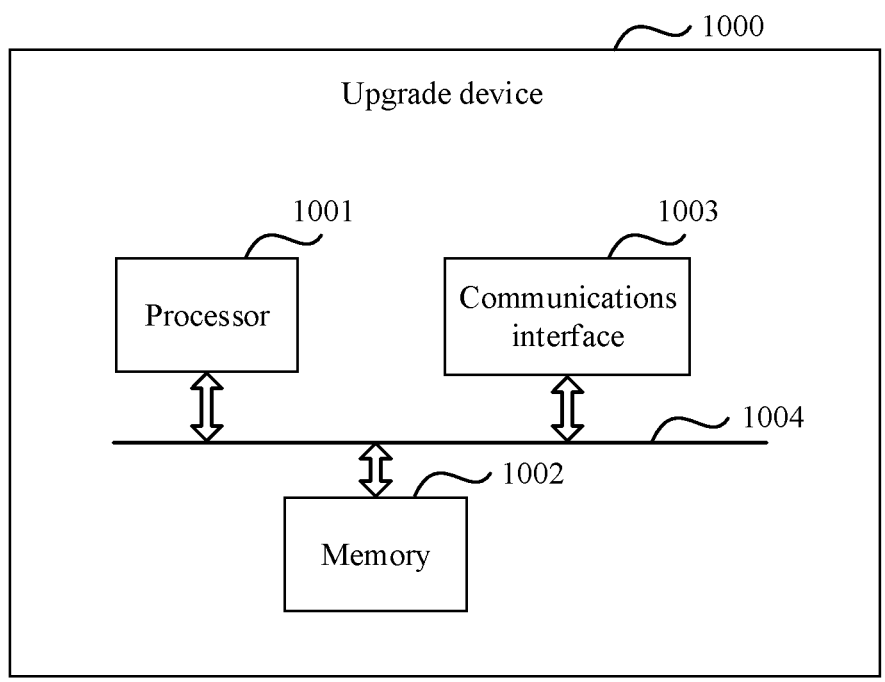
FIG. 10 is a structural diagram of an upgrade device according to an embodiment of this application.

As shown in FIG. 10, an upgrade device 1000 includes at least one processor 1001 and a memory 1002, and optionally, may further include a communications interface 1003.

The memory 1002 may be a volatile memory such as a RAM. Alternatively, the memory may be a non-volatile memory such as a ROM, a flash memory, an HDD, or an SSD. Alternatively, the memory 1002 is any other medium that can be used to carry or store expected program code in a command or data structure form and that can be accessed by a computer. However, this is not limited. The memory 1002 may be a combination of the memories.

In this embodiment of this application, a specific connection medium between the processor 1001 and the memory 1002 is not limited. In this embodiment of this application, the memory 1002 is connected to the processor 1001 through a bus 1004 in the figure. The bus 1004 is represented by a thick line in the figure. A connection manner between other components is schematically described, and is not limited thereto. The bus 1004 may be classified into an address bus, a data bus, a control bus, and the like. For ease of representation, only one thick line is used to represent the bus in FIG. 10, but this does not mean that there is only one bus or only one type of bus.

The processor 1001 may have a data receiving and sending function, and can communicate with another management device. In the apparatus shown in FIG. 10, an independent data receiving and sending module, for example, the communications interface 1003, may also be disposed and is configured to receive and send data. When communicating with the other management device, the processor 1001 may perform data transmission through the communications interface 1003.

When the upgrade device is in the form shown in FIG. 10, the processor 1001 in FIG. 10 may invoke a program stored in the memory 1002, so that the upgrade device may perform the method performed by the upgrade device in the method embodiment shown in FIG. 6.

Further, functions/implementation processes of the selection unit, the processing unit, and the upgrade unit in FIG. 8 may be implemented by the processor 1001 in FIG. 10 by invoking a computer-executable instruction stored in the memory 1002.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc (CD) ROM (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of another programmable data processing device generate an apparatus for implementing a specific function in one or more processes in the flowcharts and/or in one or more blocks in the block diagrams.

These computer program instructions may be stored in a computer-readable memory that can instruct the computer or the other programmable data processing device to work in a specific manner, so that the instructions stored in the computer-readable memory generate an artifact that includes an instruction apparatus. The instruction apparatus implements the specific function in the one or more processes in the flowcharts and/or in the one or more blocks in the block diagrams.

These computer program instructions may be loaded onto the computer or the other programmable data processing device, so that a series of operations and steps are performed on the computer or the other programmable device, thereby generating computer-implemented processing. Therefore, the instructions executed on the computer or the other programmable device provide steps for implementing the specific function in the one or more processes in the flowcharts and/or in the one or more blocks in the block diagrams.

Obviously, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A host upgrade method, comprising:
    selecting a target host from a plurality of hosts, wherein a plurality of first virtual machines on the hosts belongs to a plurality of first service groups, wherein each of the first service groups processes a first service, wherein different second service groups in the first service groups process different second services, wherein all second virtual machines deployed on the target host belong to one or more target service groups in the first service groups, wherein, for the second virtual machines, a total quantity of third virtual machines that belongs to each of the one or more target service groups is not greater than a maximum shutdown quantity corresponding to a corresponding target service group, wherein a maximum shutdown quantity corresponding to each of the first service groups is a maximum quantity of fourth virtual machines that are allowed to be shut down in each of the first service groups when the first service keeps running;
    stopping a third service running on the second virtual machines;
    maintaining a fourth service running on a fifth virtual machine that is in the one or more target service groups and that is not deployed on the target host; and
    upgrading the target host after the third service is stopped running on the second virtual machines and while the fourth service is maintained running on the fifth virtual machine.

2. The host upgrade method of claim 1, wherein before upgrading the target host, the host upgrade method further comprises migrating, to the fifth virtual machine, the third service.

3. The host upgrade method of claim 1, wherein before selecting the target host, the host upgrade method further comprises:
    obtaining a load balancing parameter indicating a ratio of a quantity of sixth virtual machines that are allowed to be shut down in a third service group when a fifth service of the third service group keeps running to a total quantity of seventh virtual machines comprised in the third service group; and
    calculating a maximum shutdown quantity of the third service group based on the load balancing parameter and the total quantity of the seventh virtual machines.

4. The host upgrade method of claim 1, wherein before upgrading the target host, the host upgrade method further comprises:
    adding the target host to an upgrade group;
    receiving a modification instruction for the upgrade group; and
    modifying, according to the modification instruction, the target host.

5. The host upgrade method of claim 1, wherein before selecting the target host, the host upgrade method further comprises obtaining information about the hosts.

6. A host upgrade method, comprising:
    selecting a first host from a plurality of hosts, wherein a plurality of first virtual machines on the hosts belongs to a plurality of first anti-affinity groups, wherein each of the first anti-affinity groups processes a first service, wherein different virtual machines in each of the first anti-affinity groups are deployed on different hosts, wherein second virtual machines deployed on the first host belong to one or more target anti-affinity groups in the first anti-affinity groups, wherein, for the second virtual machines, a total quantity of third virtual machines that belongs to each of the one or more target anti-affinity groups is not greater than a maximum shutdown quantity corresponding to a corresponding target anti-affinity group, wherein a maximum shutdown quantity corresponding to each of the first anti-affinity groups is a maximum quantity of fourth virtual machines that are allowed to be shut down in each of the first anti-affinity groups when the first service keeps running;
    selecting a second host from the hosts, wherein fifth virtual machines deployed on the second host do not belong to the one or more target anti-affinity groups;
    adding the second host and the first host to an upgrade group;
    stopping a second service running sixth virtual machines that are in the one or more target anti-affinity groups and that are deployed on a third host in the upgrade group;

maintaining a third service running on a seventh virtual machine that is in the one or more target anti-affinity groups and that is not deployed on the third host; and upgrading the third host after the second service is stopped running on the sixth virtual machines and while the third service is maintained running on the seventh virtual machine.

7. The host upgrade method of claim 6, wherein before upgrading the third host, the host upgrade method further comprises migrating, to the seventh virtual machine, the second service.

8. The host upgrade method of claim 6, wherein before selecting the first host, the host upgrade method further comprises:

obtaining a load balancing parameter indicating a ratio of a quantity of eighth virtual machines that are allowed to be shut down in a second anti-affinity group when a fourth service of the second anti-affinity group keeps running to a total quantity of ninth virtual machines comprised in the second anti-affinity group; and calculating a maximum shutdown quantity of the second anti-affinity group based on the load balancing parameter and the total quantity of the ninth virtual machines.

9. The host upgrade method of claim 6, wherein before upgrading the third host, the host upgrade method further comprises:

receiving a modification instruction for the upgrade group; and modifying, according to the modification instruction, the third host.

10. The host upgrade method of claim 6, wherein before selecting the first host, the host upgrade method further comprises obtaining information about the hosts.

11. An upgrade device comprising:

a memory configured to store program instructions; and a processor coupled to the memory, wherein the program instructions cause the processor to be configured to:

select a target host from a plurality of hosts, wherein a plurality of first virtual machines on the hosts belongs to a plurality of first service groups, wherein each of the first service groups processes a first service, wherein different second service groups in the first service groups process different second services, wherein second virtual machines deployed on the target host belong to one or more target service groups in the first service groups, wherein, for the second virtual machines, a total quantity of third virtual machines that belongs to each of the one or more target service groups is not greater than a maximum shutdown quantity corresponding to a corresponding target service group, wherein a maximum shutdown quantity corresponding to each of the first service groups is a maximum quantity of fourth virtual machines that are allowed to be shut down in each of the first service groups when the first service keeps running;

stop a third service running on the second virtual machines;

maintain a fourth service running on a fifth virtual machine that is in the one or more target service groups and that is not deployed on the target host; and upgrade the target host after the third service is stopped running on the second virtual machines and while the fourth service is maintained running on the fifth virtual machine.

12. The upgrade device of claim 11, wherein the program instructions further cause the processor to be configured to migrate, to the fifth virtual machine, the third service.

13. The upgrade device of claim 11, wherein the program instructions further cause the processor to be configured to:

obtain a load balancing parameter indicating a ratio of a quantity of sixth virtual machines that are allowed to be shut down in a third service group when a fifth service of the third service group keeps running to a total quantity of seventh virtual machines comprised in the third service group; and calculate a maximum shutdown quantity of the third service group based on the load balancing parameter and the total quantity of the seventh virtual machines.

14. The upgrade device of claim 11, wherein the program instructions further cause the processor to be configured to:

add the target host to an upgrade group;

receive a modification instruction for the upgrade group; and modify, according to the modification instruction, the target host.

15. The upgrade device of claim 11, wherein before selecting the target host, the program instructions further cause the processor to be configured to obtain information about the hosts.

16. An upgrade device comprising:

a memory configured to store program instructions; and a processor coupled to the memory, wherein the program instructions cause the processor to be configured to:

select a first host from a plurality of hosts, wherein a plurality of first virtual machines on the hosts belongs to a plurality of first anti-affinity groups, wherein each of the first anti-affinity groups processes a first service, wherein different virtual machines in each of the first anti-affinity groups are deployed on different hosts, wherein second virtual machines deployed on the first host belong to one or more target anti-affinity groups in the first anti-affinity groups, wherein, for the second virtual machines, a total quantity of third virtual machines that belongs to each of the one or more target anti-affinity groups is not greater than a maximum shutdown quantity corresponding to a corresponding target anti-affinity group, wherein a maximum shutdown quantity corresponding to each of the first anti-affinity groups is a maximum quantity of fourth virtual machines that are allowed to be shut down in each of the first anti-affinity groups when the first service keeps running;

select a second host from the plurality of hosts, wherein fifth virtual machines deployed on the second host do not belong to the one or more target anti-affinity groups;

add the second host and the first host to an upgrade group;

stop a second service running sixth virtual machines that are in the one or more target anti-affinity groups and that are deployed on a third host in the upgrade group;

maintain a third service running on a seventh virtual machine that is in the one or more target anti-affinity groups and that is not deployed on the third host; and upgrade the third host after the second service is stopped running on the sixth virtual machines and while the third service is maintained running on the seventh virtual machine.

17. The upgrade device of claim 16, wherein the program instructions further cause the processor to be configured to migrate, to the seventh virtual machine, the second service.

18. The upgrade device of claim 16, wherein the program instructions further cause the processor to be configured to:
   obtain a load balancing parameter indicating a ratio of a quantity of eighth virtual machines that are allowed to be shut down in a second anti-affinity group when a fourth service of the second anti-affinity group keeps running to a total quantity of ninth virtual machines comprised in the second anti-affinity group; and
   calculate a maximum shutdown quantity of the second anti-affinity group based on the load balancing parameter and the total quantity of the ninth virtual machines.

19. The upgrade device of claim 16, wherein the program instructions further cause the processor to be configured to:
   receive a modification instruction for the upgrade group; and
   modify, according to the modification instruction, the third host.

20. The upgrade device of claim 16, wherein before selecting the first host, the program instructions further cause the processor to be configured to obtain information about the hosts.

\* \* \* \* \*

UNITED STATES PATENT AND TRADEMARK OFFICE
CERTIFICATE OF CORRECTION

| | |
|---|---|
| PATENT NO. | : 11,886,905 B2 |
| APPLICATION NO. | : 17/213719 |
| DATED | : January 30, 2024 |
| INVENTOR(S) | : Wei Gao and Muqiang Xia |

It is certified that error appears in the above-identified patent and that said Letters Patent is hereby corrected as shown below:

In the Claims

Claim 1, Column 25, Line 57: "groups process different second services, wherein all" should read "groups process different second services, wherein"

Claim 16, Column 28, Line 51: "select a second host from the plurality of hosts, wherein" should read "select a second host from the hosts, wherein"

Signed and Sealed this
Second Day of April, 2024

Katherine Kelly Vidal
*Director of the United States Patent and Trademark Office*